(12) United States Patent
Newhart

(10) Patent No.: US 8,363,825 B1
(45) Date of Patent: Jan. 29, 2013

(54) DEVICE FOR AND METHOD OF COLLISION-FREE HASHING FOR NEAR-MATCH INPUTS

(75) Inventor: Donald W. Newhart, Elkridge, MD (US)

(73) Assignee: The United States of America as Represented by the Director, National Security Agency, Washington, DC (US)

( * ) Notice: Subject to any disclaimer, the term of this patent is extended or adjusted under 35 U.S.C. 154(b) by 646 days.

(21) Appl. No.: 12/454,691

(22) Filed: May 21, 2009

(51) Int. Cl.
*H04L 9/00* (2006.01)
(52) U.S. Cl. .......................................................... 380/26
(58) Field of Classification Search ...................... 380/26
See application file for complete search history.

(56) References Cited

U.S. PATENT DOCUMENTS

| | | | |
|---|---|---|---|
| 7,257,224 B2 * | 8/2007 | Koshiba | 380/28 |
| 7,382,876 B2 | 6/2008 | Lauter et al. | |
| 2007/0291934 A1 * | 12/2007 | Volkovs et al. | 380/28 |
| 2009/0067620 A1 | 3/2009 | Billet et al. | |
| 2009/0085780 A1 | 4/2009 | Vijayrangan | |
| 2010/0111296 A1 * | 5/2010 | Brown et al. | 380/28 |

* cited by examiner

*Primary Examiner* — Krista Zele
*Assistant Examiner* — Esther Benoit
(74) *Attorney, Agent, or Firm* — Robert D. Morelli

(57) ABSTRACT

A device and method of collision-free hashing of near-match inputs that includes the following components. An adder for receiving an input i, a check value cv, and outputs n, which is greater than or equal to the sum of i and cv. A checker for receiving a value n, a value d, a first polynomial, and an output at which the first polynomial appears if the checker determines that the first polynomial is of degree proportional to d and divides $x^n+1$. A factorization block for factoring the first polynomial into a second polynomial and a third polynomial. A first division block for dividing an input of bit length i by the second polynomial to generate a first portion of the hash of the input. A second division block for dividing the input by the third polynomial to generate a second portion of the hash of the input.

4 Claims, 2 Drawing Sheets

DEVICE FOR AND METHOD OF COLLISION-FREE HASHING FOR NEAR-MATCH INPUTS

FIELD OF INVENTION

The present invention relates, in general, to cryptography and, in particular, to particular algorithmic function encoding.

BACKGROUND OF THE INVENTION

A hash function is a function that receives input data of an arbitrary bit length and generates an output of a fixed bit length, where the length of the output is user-definable. Hash functions are useful for generating message authentication codes and Bloom filters for determining if a data element is a member of a set.

Since a hash function maps data of a certain length to data of a shorter length, there are fewer possible outputs then there are inputs. So, some inputs will map to the same output. Such a mapping is commonly referred to as a collision. Knowing what inputs to a hash function cause collisions could provide a person with information that would help that person compromise a cryptographic algorithm that uses the hash function.

Since collisions are inherent in any hash function that receives a larger input then the output it produces, one cannot totally eliminate collisions. However, one may make it more time consuming to find collisions by ensuring that collisions occur only for inputs that differ from each other by more than a trivial number of bit locations so that one must spend more time searching for inputs that cause collisions. Therefore, there is a need for a hash function that does not produce collisions for inputs that are near matches of each other, where a near match is one where the number of bit locations that differ is small and, therefore, could more easily be found than if the inputs were not near-matches.

U.S. Pat. No. 7,382,876, entitled "HASH FUNCTION CONSTRUCTION FROM EXPANDER GRAPHS," discloses a hash function in which it is difficult to find collisions by dividing an input to a hash function into segments, walking an expander graph based on respective input segments, determining a label of the last vertex walked, and outputting the label as the result of the hash function. U.S. Pat. No. 7,382,876 is hereby incorporated by reference into the present specification.

U.S. Pat. Appl. No. 20070291934, entitled "METHODS, SYSTEMS AND COMPUTER PROGRAM FOR POLYNOMIAL BASED HASHING AND MESSAGE AUTHENTICATION CODING WITH SEPARATE GENERATION OF SPECTRUMS," discloses a hash function that represents an initial sequence of bits as a specially constructed set of polynomials, transforms the set by masking, partitions the transformed set into a plurality of classes, forms a bit string during partitioning, factoring for each class each of the polynomials, collecting the factors, wrapping the factors, organizing the wrappings, and performing an exponentiation of the organizations to obtain a hash value. U.S. Pat. Appl. No. 20070291934 is hereby incorporated by reference into the present specification.

U.S. Pat. Appl. No. 20090067620, entitled "CRYPTOGRAPHIC HASHING DEVICE AND METHOD," discloses a hash function that forms a sequence of data m-tuples from a message, where m is a positive integer, interatively calculating successive output p-tuples, where p is a positive integer corresponding to the sequence of data m-tuples as a function of at least one set of multivariate polynomials defined over a finite field, and determining a hash value as a function of the last p-tuple output. U.S. Pat. Appl. No. 20090067620 is hereby incorporated by reference into the present specification.

U.S. Pat. Appl. No. 20090085780, entitled "METHOD FOR PREVENTING AND DETECTING HASH COLLISIONS OF DATA DURING DATA TRANSMISSION," discloses a means for avoiding hash collisions by pre-processing a message to increase randomness and reducing redundancy in a manner that includes a bit shuffler, a compression T-function, and a linear feedback shift register. U.S. Pat. Appl. No. 20090085780 is hereby incorporated by reference into the present specification.

SUMMARY OF THE INVENTION

It is an object of the present invention to generate a collision-free hash for near-match inputs.

The present invention is a device for and a method of collision-free hashing for near-match inputs.

The device of the present method includes an adder, having a first input for receiving a user-definable value i representing a bit length of an input, having a second input for receiving a user-definable value cv representing a bit length of a check value, and having an output at which appears a value n that is greater than or equal to the sum of i and cv.

The device further includes a checker, having a first input connected to the output of the adder, having a second input for receiving a user-definable value d representing a degree of a first polynomial, having a third input for receiving a user-definable first polynomial for a cyclic code, and an output at which the first polynomial appears if the checker determines that the first polynomial divides $x^n+1$.

The device further includes a factorization block for factoring the first polynomial into a second polynomial and a third polynomial, if possible, having an input connected to the output of the checker, having a first output at which appears the second polynomial, if any, and having a second output at which appears the third polynomial if any.

The device further includes a first division block for dividing an input of bit length i by the second polynomial to generate a first portion of the hash of the input, having a first input connected to the first output of the factorization block, having a second input for receiving the input, and having an output at which the first portion of the hash of the input appears.

The device further includes a second division block for dividing the input by the third polynomial to generate a second portion of the hash of the input, having a first input connected to the second output of the factorization block, having a second input for receiving the input, and having an output at which the second portion of the hash of the input appears.

The first step of the method is selecting a user-definable minimum number of bit positions d that must differ between a first input and a second input before a collision of hashes of the first input and the second input can occur.

The second step of the method is selecting a user-definable degree of a first polynomial for a cyclic code, where the degree of the first polynomial is proportional to d.

The third step of the method is selecting a user-definable bit length i of each of the first input and the second input.

The fourth step of the method is selecting a user-definable bit length cv of a check value, where cv is greater than or equal to d.

The fifth step of the method is setting $n \geq i+cv$.

The sixth step of the method is generating the first polynomial, where the first polynomial divides $x^n+1$.

The seventh step of the method is factoring the first polynomial into a second polynomial and a third polynomial.

The eighth step of the method is receiving the first input.

The ninth step of the method is dividing the first input by the second polynomial.

The tenth step of the method is dividing the first input by the third polynomial.

The eleventh step of the method is identifying the results of the ninth step and the tenth step as a hash of the first input.

DETAILED DESCRIPTION

The present invention is a device for and method of collision-free hashing of near-match inputs, where a near match of two inputs to be hashed is defined as two inputs that differ in no more than a user-definable number d of bit positions.

Figure 1:
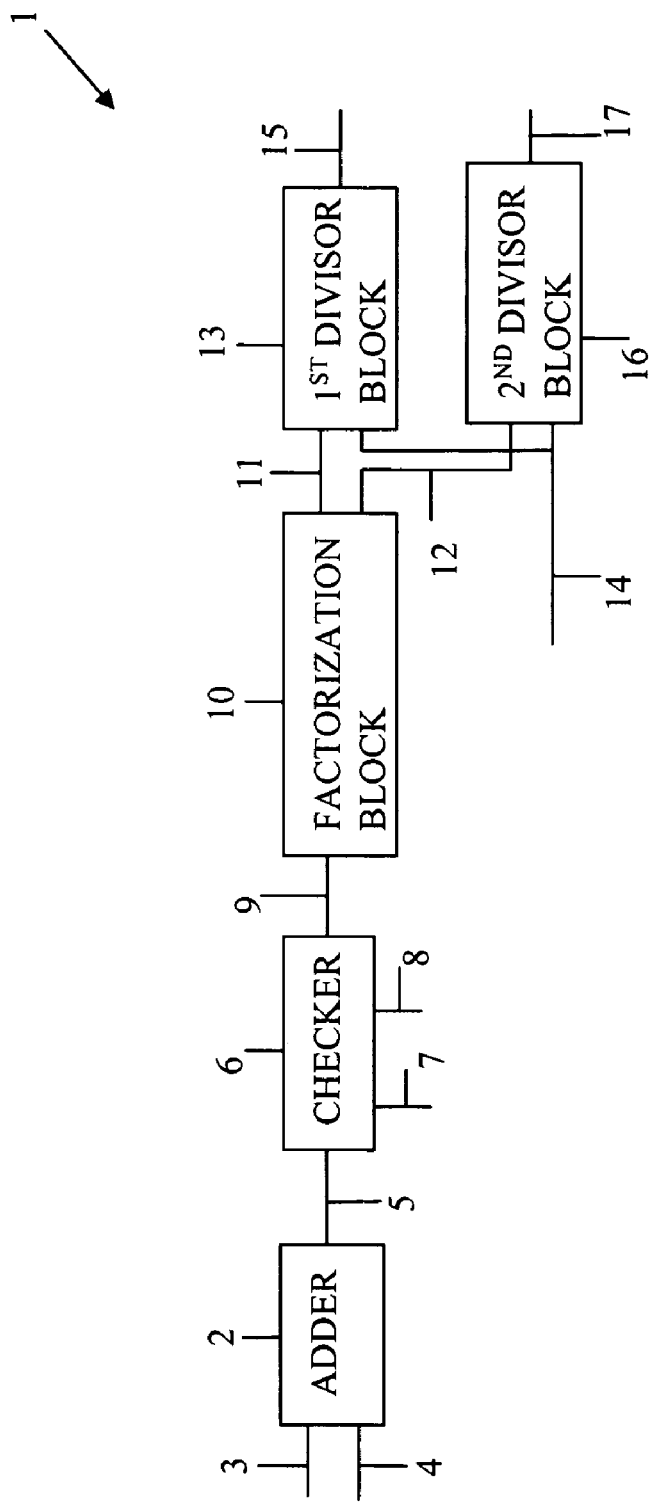
FIG. 1 is a schematic of the present invention.

FIG. 1 is a schematic of the device 1 of the present invention.

The device 1 includes an adder 2 for adding a user-definable bit length of an input to be hashed i to a user-definable bit length of a check value cv to form a value n that is greater than or equal to the sum of i and cv and will be used to check that a user-definable first polynomial for a cyclic code meets the requirements of the present invention. The adder 2 has a first input 3 for receiving the input to be hashed i. The adder 2 has a second input 4 for receiving the check value cv. The adder 2 has an output 5 at which appears a value n that is greater than or equal to the sum of i and cv.

The device 1 further includes a checker 6 for checking to ensure that a user-definable first polynomial for a cyclic code has a degree that is proportional to a user-definable minimum number of bit positions d that must differ between the input to be hashed and a subsequent input to be hashed before a collision of hashes of the two inputs can occur and divides $x^n+1$. The checker 6 has a first input connected to the output 5 of the adder 2. The checker 6 has a second input 7 for receiving the user-definable value d. The checker 6 has a third input 8 for receiving the user-definable first polynomial. The checker 6 has an output 9 at which the first polynomial will appear if it has degree proportional to d and divides $x^n+1$.

The device 1 further includes a factorization block for factoring the first polynomial into a second polynomial and a third polynomial, if possible. The factorization block 10 has an input connected to the output 9 of the checker 6. The factorization block 10 has a first output 11 at which appears the second polynomial, if any. The factorization block 10 has a second output 12 at which appears the third polynomial, if any.

The device 1 further includes a first division block 13 for dividing the input of bit length i by the second polynomial to generate a first portion of the hash of the input. The first division block 13 has a first input connected to the first output 11 of the factorization block 10. The first division block 13 has a second input 14 for receiving the input to be hashed. The first factorization block 13 has an output 15 at which the first portion of the hash of the input appears.

The device 1 further includes a second division block 16 for dividing the input of bit length i by the third polynomial to generate a second portion of the hash of the input. The second division block 16 has a first input connected to the second output 12 of the factorization block 10. The second division block 16 has a second input 14 for receiving the input to be hashed. The second factorization block 16 has an output 17 at which the second portion of the hash of the input appears.

The first and second portions of the hash of the input are combined to form the hash of the input. The combination may be a set of the two hash portions or a user-definable mathematical or logical combination of the two portions (e.g., concatenation, addition, exclusive-or, etc.).

Figure 2:
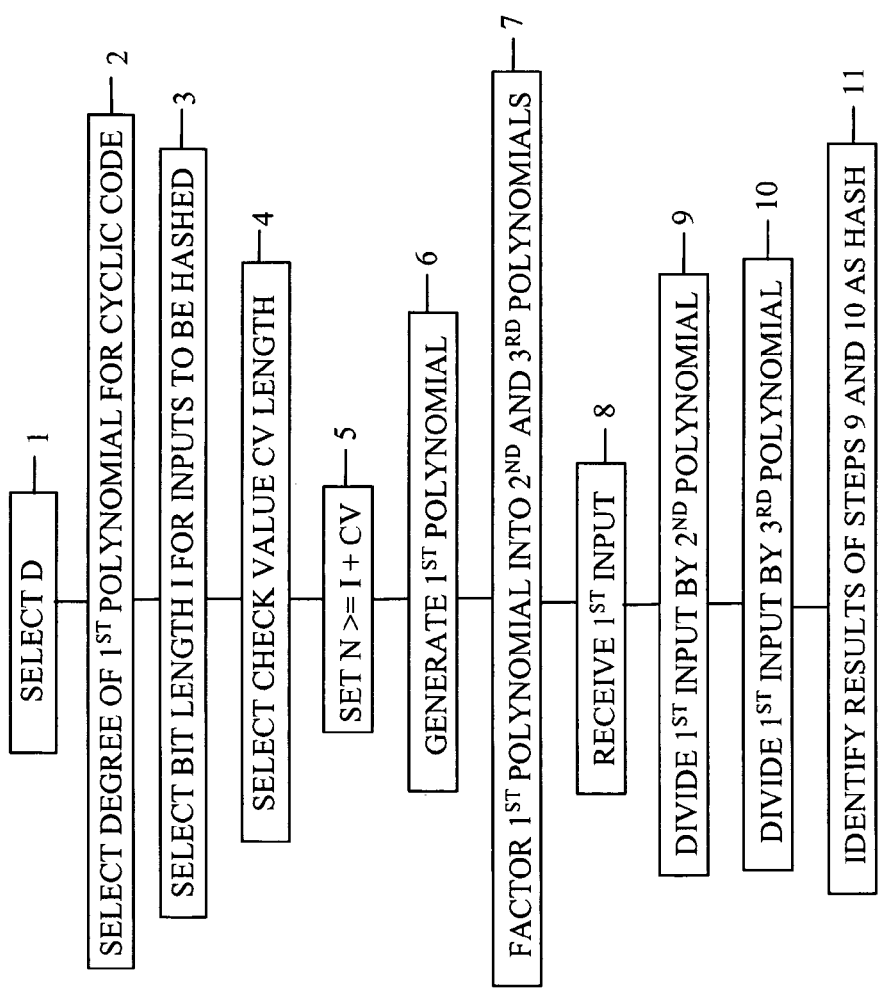
FIG. 2 is a flowchart of the steps of the present invention.

FIG. 2 is a flow chart of the method of the present invention.

The first step 21 of the method is selecting a user-definable minimum number of bit positions d that must differ between a first input and a second input before a collision of hashes of the first input and the second input can occur.

The second step 22 of the method is selecting a user-definable degree of a first polynomial for a cyclic code, where the degree of the first polynomial is proportional to d.

The third step 23 of the method is selecting a user-definable bit length i of each of the first input and the second input.

The fourth step 24 of the method is selecting a user-definable bit length cv of a check value, where cv is greater than or equal to d.

The fifth step 25 of the method is setting $n >= i+cv$.

The sixth step 26 of the method is generating the first polynomial, where the first polynomial divides $x^n+1$.

The seventh step 27 of the method is factoring the first polynomial into a second polynomial and a third polynomial.

The eighth step 28 of the method is receiving the first input.

The ninth step 29 of the method is dividing the first input by the second polynomial.

The tenth step 30 of the method is dividing the first input by the third polynomial.

The eleventh step 31 of the method is identifying the results of the ninth step 29 and the tenth step 30 as a hash of the first input. The results of the ninth step 29 and the tenth step 30 are combined to form the hash of the input. The combination may be a set of the two results or a user-definable mathematical or logical combination of the two results (e.g., concatenation, addition, exclusive-or, etc.).

What is claimed is:

1. A device for collision-free hashing for near-match inputs, comprising:

a) an adder, having a first input for receiving a user-definable value i representing a bit length of an input, having a second input for receiving a user-definable value cv representing a bit length of a check value, and having an output at which appears a value n that is greater than or equal to the sum of i and cv;

b) a checker, having a first input connected to the output of the adder, having a second input for receiving a user-definable value d representing the number of bits between an input to be hashed and a subsequent input to be hashed that must differ before a collision can occur, having a third input for receiving a user-definable first polynomial for a cyclic code, and an output at which the first polynomial appears if the checker determines that the first polynomial is of degree proportional to d and divides $x^n+1$;

c) a factorization block for factoring the first polynomial into a second polynomial and a third polynomial, if possible, having an input connected to the output of the checker, having a first output at which appears the second polynomial, if any, and having a second output at which appears the third polynomial if any;

d) a first division block for dividing an input of bit length i by the second polynomial to generate a first portion of the hash of the input, having a first input connected to the first output of the factorization block, having a second input for receiving the input, and having an output at which the first portion of the hash of the input appears; and e) a second division block for dividing the input by the third polynomial to generate a second portion of the hash of the input, having a first input connected to the second output of the factorization block, having a second input for receiving the input, and having an output at which the second portion of the hash of the input appears.

2. The device of claim 1, further including a combiner for combining the first portion and the second portion of the hash of the input, having a first input connected to the output of the first division block, having a second input connected to the output of the second division block, where the combiner is a combiner selected from the group of combiners consisting of concatenator, user-definable mathematical combine; and user-definable logical combiner.

3. The device of claim 2, wherein said mathematical combiner is selected from the group of mathematical combiners consisting of adder, multiplier, subtractor, divider, and any combination thereof.

4. The device of claim 2, wherein said logical combiner is selected from the group of logical combiners consisting of AND, OR, NOR, NOT, XOR, XNOR, and any combination thereof.

* * * * *